No. 651,035. Patented June 5, 1900.
W. D. GREGORY.
RUBBER TIRED WHEEL.
(Application filed Sept. 6, 1899.)
(No Model.) 2 Sheets—Sheet 2.

Witnesses
Inventor
W. D. Gregory
by H. B. Willson & Co.
Attorneys

UNITED STATES PATENT OFFICE.

WALTER D. GREGORY, OF NEWARK, NEW JERSEY.

RUBBER-TIRED WHEEL.

SPECIFICATION forming part of Letters Patent No. 651,035, dated June 5, 1900.

Application filed September 6, 1899. Serial No. 729,579. (No model.)

*To all whom it may concern:*

Be it known that I, WALTER D. GREGORY, a citizen of the United States, residing at Newark, in the county of Essex and State of New Jersey, have invented certain new and useful Improvements in Rubber-Tired Wheels; and I do declare the following to be a full, clear, and exact description of the invention, such as will enable others skilled in the art to which it appertains to make and use the same.

The invention relates to elastic-tired wheels.

The object of the invention is to provide a simple, durable, and comparatively-inexpensive wheel, one in which the liability of the rubber tire accidentally slipping off is reduced to a minimum.

To this end the invention consists in certain features of construction and combination of parts, which will be hereinafter fully described and claimed.

Figure 1:
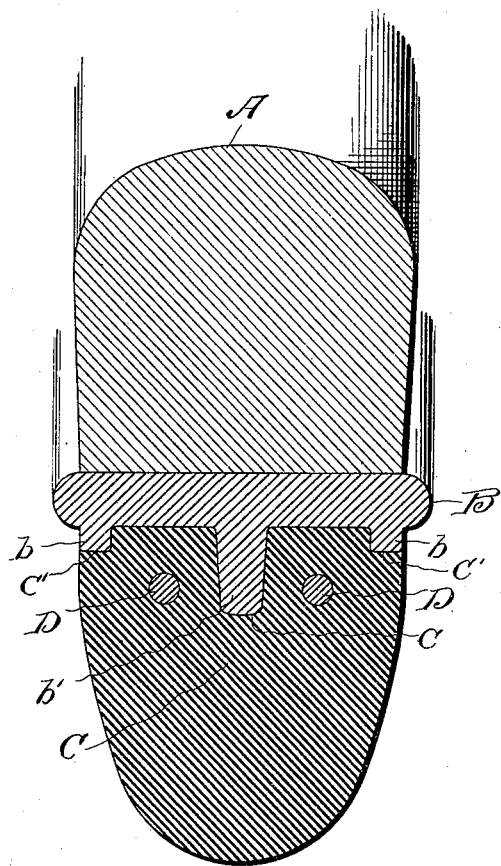
Figure 2:
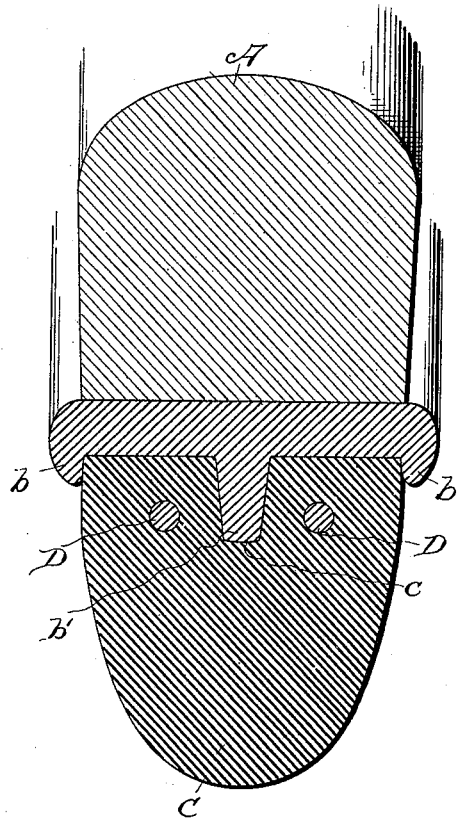

In the drawings, Figure 1 is a sectional view of one form of my improved tire, and Fig. 2 is a similar view of another form.

In the drawings the same reference characters indicate the same parts of the invention.

A represents the wooden rim, B the metallic tire, and C the elastic tread. The metallic tire is preferably provided along its marginal edges with downwardly-projecting annular ribs $b$ and with a central annular web $b'$, which projects downward quite a distance below the ribs $b$.

The tread is provided with an annular recess $c$ to take the web $b'$ and with annular recesses $c'$ to take the ribs $b$.

The tire is held in position by wires D, which are molded or otherwise secured therein. These wires D are located between the ribs $b$ and the web $b'$, the latter projecting downwardly below the wires, so that the strain upon the tire when the vehicle is rounding corners will be resisted by both wires, which would not be the case were the wires arranged below the web $b'$.

In Fig. 2 I have shown my invention used in connection with an elastic tire having a flat inner periphery, the tire being arranged between the marginal ribs $b$.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

1. In an elastic-tread wheel, a wooden rim, a metallic tire provided with an annular web arranged intermediate the edges of the tire, an elastic tread fitted to the said tire, and wires located in said elastic tread arranged on opposite sides of the web and equidistant between the plane of the tire and the periphery of the web, substantially as and for the purpose set forth.

2. In an elastic-tread wheel, a wooden rim, a metallic tire provided with an annular web arranged intermediate the edges of the tire and with marginal annular ribs or beads, a rubber or other elastic tread fitted to said tire, and wires located in said tread on opposite sides of the web and equidistant from the plane of the tire and the outer periphery of the web, substantially as and for the purpose set forth.

3. In an elastic-tread wheel, the combination with the wooden rim, of a metallic tire provided with marginal inwardly-projecting ribs or beads and intermediate projecting annular web or webs that project beyond the ribs or beads, an elastic tread of rubber or other elastic material having recesses to receive the web or webs and the ribs or beads, or without recesses for the ribs or beads and arranged so that the elastic material is no wider than the distance between the ribs or beads, and securing-wires embedded in said elastic tread and arranged on either side of the web and equidistant from the plane of the tire and the outer periphery of the web, substantially as and for the purpose set forth.

In testimony whereof I have hereunto set my hand in presence of two subscribing witnesses.

WALTER D. GREGORY.

Witnesses:
C. H. SLEIGHT,
GEO. O. TOTTEN.